United States Patent
Mortensen

(10) Patent No.: US 12,222,242 B2
(45) Date of Patent: Feb. 11, 2025

(54) LINEARIZATION OF MERCURY CADMIUM TELLURIDE PHOTODETECTORS

(71) Applicant: THERMO ELECTRON SCIENTIFIC INSTRUMENTS LLC, Madison, WI (US)

(72) Inventor: Nicolai Bech Mortensen, Madison, WI (US)

(73) Assignee: Thermo Electron Scientific Instruments LLC, Madison, WI (US)

( * ) Notice: Subject to any disclaimer, the term of this patent is extended or adjusted under 35 U.S.C. 154(b) by 372 days.

(21) Appl. No.: 17/655,985

(22) Filed: Mar. 22, 2022

(65) Prior Publication Data

US 2023/0304859 A1     Sep. 28, 2023

(51) Int. Cl.
    *G01J 3/02*     (2006.01)
(52) U.S. Cl.
    CPC .................. *G01J 3/0297* (2013.01)
(58) Field of Classification Search
    CPC .... G01J 3/0297; G01J 3/45; G01J 5/28; G01J 5/808; G01J 1/0295; G01J 1/42; G01N 2021/3595; G01N 21/274
    See application file for complete search history.

(56) References Cited

U.S. PATENT DOCUMENTS

| | | | | |
|---|---|---|---|---|
| 4,927,269 A | * | 5/1990 | Keens | G01J 3/45 |
| | | | | 356/451 |
| 2006/0038113 A1 | * | 2/2006 | Riedel | G01J 1/10 |
| | | | | 250/214 R |
| 2008/0024951 A1 | * | 1/2008 | Mortensen | H02M 1/44 |
| | | | | 361/118 |
| 2020/0116569 A1 | * | 4/2020 | Spartz | G01N 21/3504 |
| 2020/0119520 A1 | * | 4/2020 | Bayer | H01S 5/02415 |

FOREIGN PATENT DOCUMENTS

| | | |
|---|---|---|
| EP | 3133380 A1 | 2/2017 |
| EP | 3415881 A1 | 12/2018 |
| JP | H1123367 A | 1/1999 |

OTHER PUBLICATIONS

Extended European Search Report from European Application No. 231620802.5, dated Aug. 18, 2023, 10 pages.
Shao et al., "Correcting nonlinear response of mercury cadmium telluride detectors in open path Fourier transform infrared spectrometry," Analytical Chemistry, 80(13): 5219-5224 (2008).
Lachance, "Non-linearity correction of FTIR instruments," Fifth Workshop of Infrared Emission Measurements by FTIR, 27 pp (2000).
Zhang et al., "Absolute detector calibration applied to nonlinearity error correction in FT-IR measurements," Applied Spectroscopy, 51(4): 576-579 (1997).

* cited by examiner

*Primary Examiner* — David P Porta
*Assistant Examiner* — Gisselle M Gutierrez
(74) *Attorney, Agent, or Firm* — Klarquist Sparkman, LLP

(57) ABSTRACT

Methods for linearization of photodetector response include establishing one or more static calibration coefficients based on comparison of test photodetector response to a linear reference photodetector. In some examples, dynamic calibration coefficients are determined based on average photodetector signals. In some applications such as FTIR, linearized ratios are obtained with a single calibration coefficient.

13 Claims, 12 Drawing Sheets

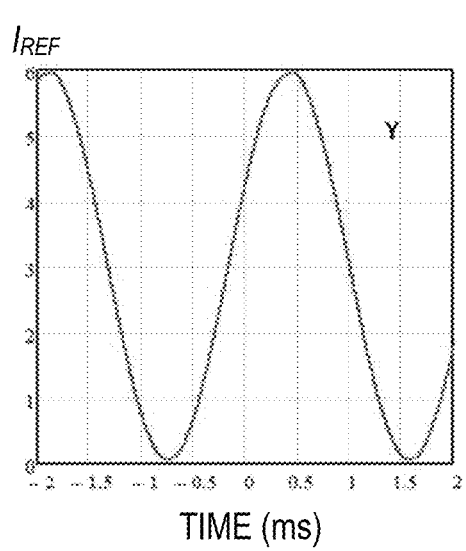
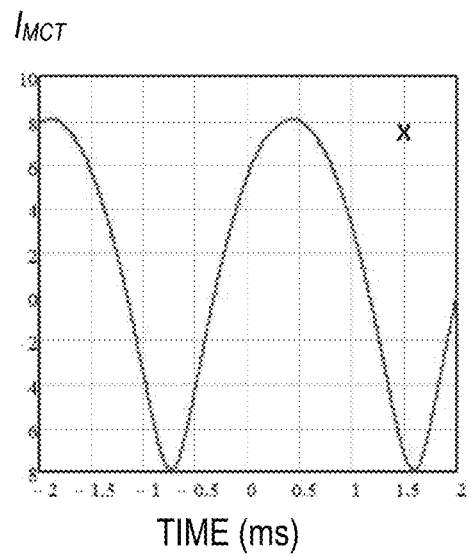
FIG. 2A
FIG. 2B
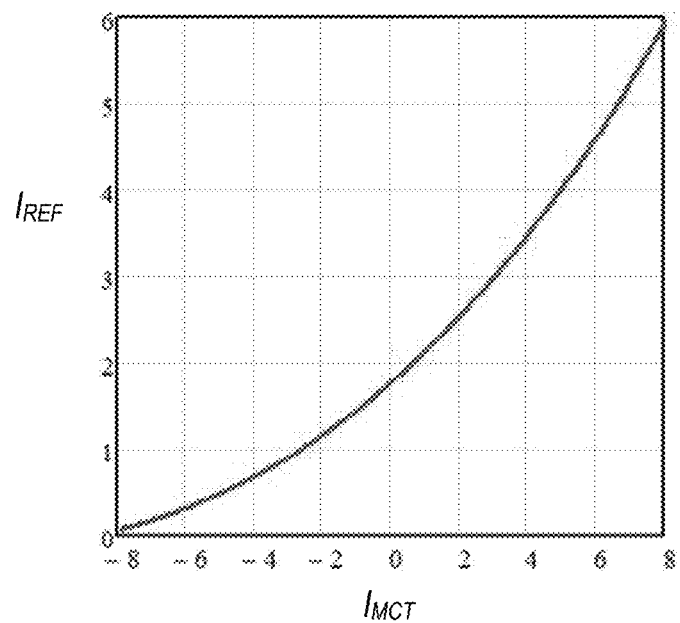
FIG. 2C

LINEARIZATION OF MERCURY CADMIUM TELLURIDE PHOTODETECTORS

FIELD

The disclosure pertains to photodetector compensation.

BACKGROUND

Typical photodetectors for use at wavelengths in the short-wavelength infrared band (about 1.4 µm to 3 µm), the mid-wavelength infrared band (about 3 µm to 8 µm), the long-wavelength infrared band (8 µm to 15 µm), and far infrared band (15 µm to 1000 µm) exhibit non-linear response to input optical radiation. In some applications, such non-linearities do not appreciably limit detector usability, but in other applications, even small deviations from linear response are problematic. For example, some applications required detection of optical radiation over power ranges spanning 6 or more orders of magnitude. Any detector nonlinearities make comparisons of small and large signal values inaccurate. In applications such as Fourier Transform spectroscopy, detector nonlinearity introduces or enhances frequency components in a manner unrelated to the properties of a sample under investigation. Approaches are needed that address these and other limitations.

SUMMARY

Methods comprise directing a modulated optical beam to a test photodetector and obtaining a modulation amplitude of a photo-signal associated with detection of a first portion of the modulated optical beam by the test photodetector. Based on the modulation amplitude of the photo-signal from the test photodetector, at least one first calibration coefficient operable to linearize the test photodetector is determined and stored in a memory device. In some examples, a second portion of the modulated optical beam is directed to a reference photodetector to obtain a modulation amplitude of a photo-signal associated with detection of the second portion of the modulated optical beam by the reference photodetector. Based on the modulation amplitudes of the photo-signals from the test photodetector and the reference photodetector, the at least one first calibration coefficient is determined.

Representative FTIR systems comprise a photodetector, a memory device storing at least one calibration coefficient associated with the photodetector, and a processor coupled to receive a photo-signal responsive to irradiation of the photodetector and linearize the photo-signal based on the at least one calibration coefficient. In some examples, the least one calibration coefficient includes one or more of calibration coefficients a, b, c, wherein a linearized photo-signal $I_{LINEAR}$ associated with a measured photo-signal $I_{MEAS}$ is produced as $I_{LINEAR}=a\exp(bI_{MEAS})+c$. In some examples, the processor is coupled linearize the photo-signal based on a back calculation of the received photo-signal to a network node between the first amplifier and the second amplifier.

The foregoing and other features and advantages of the technology will become more apparent from the following detailed description, which proceeds with reference to the accompanying figures.

BRIEF DESCRIPTION OF THE DRAWINGS

FIGS. 2A-2C illustrate photodetector calibration data that can be acquired with a system such as illustrated in FIG. 2.

DETAILED DESCRIPTION

Figure 1:
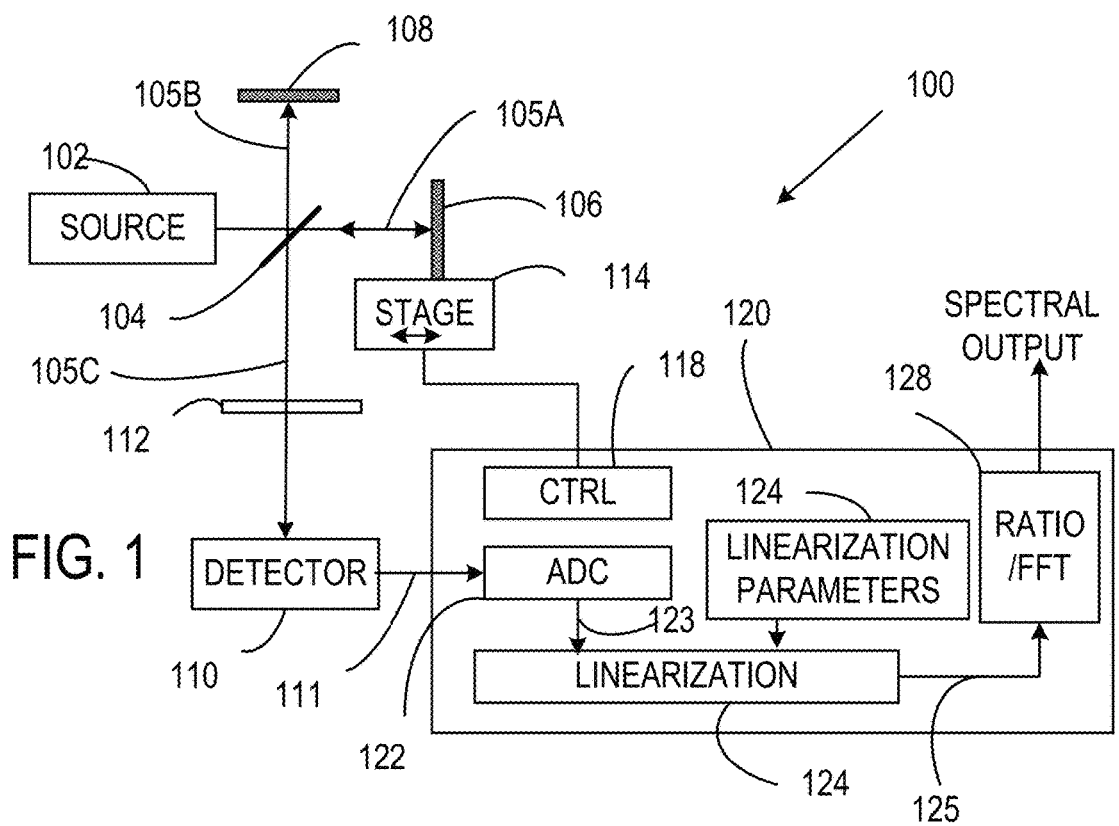
FIG. 1 illustrates a representative Fourier Transform Infrared Spectrometer (FTIR) that includes a linearized HgCdTe (MCT) photodetector.

As used herein, "sample photodetector" and "test photodetector" refer to photodetectors for which calibration is to be produced. Calibration of a single sample detector can, in some cases, suffice to be used with other photodetectors of the same configuration or type. Alternatively, individual photodetectors can be provided with their own unique calibration coefficients which can be stored in a processor readable memory device coupled or supplied with each. In some examples, a calibrated or intrinsically linear photodetector is used to compare and calibrate responses to optical beam modulations and such photodetectors are referred to as "reference photodetectors." A reference photodetector can be a photodetector that is inherently suitably linear or a previously calibrated test photodetector can be used as a reference photodetector. In the examples below, calibration of HgCdTe (MCT or mercury cadmium telluride) photodetectors and uses of such calibrated MCT photodetectors are described for convenient illustration. but other ultraviolet, visible, or infrared photodetectors or photodetectors for other ranges can be used. In some cases, photodetectors can be operated linearly in some electrical circuit connections and nonlinearly in others and calibration can be performed for any or all configurations as needed.

The disclosed approaches are typically illustrated using a reference photodetector to produce a photo-signal to be used for linearization or other compensation of a photodetector under test. In other examples, a light source or variable optical attenuator can be provided with a reference electrical signal to produce a reference light beam. In these examples, linearization or compensation can be based on the reference electrical signal. While a reference detector with a linear response is convenient for calibration, any photodetector with a known response characteristic can be used. In the examples, photodetectors and associated electronics (e.g., amplifiers) are referred to as producing DC signal components or as being DC coupled. As used herein, such photodetectors and associated electronics produce photo-signals that include signal contributions associated with average values of received optical radiation. Thus, photo-signals are reflective of both an average value and spectrally-induced modulations. In some examples, multiple amplifier stages are used and, in such examples, only a first stage (the stage coupled to the photodetector) is necessarily DC coupled so that a signal portion indicative of the DC component of received optical radiation can be produced. If a DC component of a signal has been completely eliminated, then later stage amplifier(s) can be AC coupled. However, since the DC component is generally not perfectly removed, it can be preferable to have the entire amplifier chain DC coupled. With suitable measurement and processing as discussed below, subsequent amplifier stages need not be DC coupled. In the examples below, an average photo-signal value associated with photo-signal measurement is indicative of power delivered to a test photodetector and is referred to as $E_{EFF}$. In some examples, test photodetector calibration coefficients are dynamic and vary as a function of $E_{EFF}$ or other measure of average power. As used herein, a static calibration coefficient refers to a value obtained without variation based on $E_{EFF}$ or other indication of average photo-signal; a dynamic calibration coefficient refers to a value that is a function of $E_{EFF}$ or other indication of average photo-signal.

One example application of the disclosed approaches is FTIR. Although MCT detectors are commonly used in FTIR, other detectors such as pyroelectric detectors based on deuterated triglycine sulfate, lithium tantalate, InGaAs, silicon or germanium bolometers, or other photodetectors can be similarly compensated if needed.

In the following, correction or compensation of a photodetector output signal is discussed with reference to linearization. i. e, compensation of the photodetector output signal or a signal based on the photodetector output signal to be proportional to detected optical power. Other types of compensation can be provided so that photodetector output signals have other predetermined relationships to detected optical power. In the examples discussed below, linearization is discussed in which compensated photodetector output signals or other signals are proportional to detected optical power within 5%, 2%, 1%, 0.5%, 0.1%, 0.01% or less. Photodetector compensation is referred to also as calibration in the disclosed approaches, and calibration or compensation parameters are obtained based on a particular model (an exponential) but calibration parameters can be based on second, third, or fourth order polynomials, Bezier curves, or other functions as well. In some examples below, calibration of HgTeCd ("MCT") detectors is described, but other detector types can be similarly calibrated. "Photodetector output signal" refers to an electrical current, voltage, or combination thereof produced by a photodetector in response to received optical radiation. The term "signal" refers to time-varying electrical current or voltage produced in response to processing of a photodetector output signal. Such signals can correspond to a photodetector output signal that has been amplified, filtered, or otherwise processed, either as an analog signal or a digital signal. For convenience, photodetector output signals and signals responsive to photodetector output signals such as processed photodetector output signals are referred to herein generally as "photo-signals." In addition, while signal refers to a time-varying current or voltage, such time variations can be obtained and stored as digital representations corresponding to a series of signal magnitudes stored in a processor-readable memory device. These digital signals are generally defined to represent a time variation of an analog signal. For example, a series of photo-signal values I(n), wherein n=0, 1, . . . , N−1, wherein N is a positive integer is also referred to as photo-signal having a time variation based defined by n. As used herein, I can refer to an optical power or a photo-signal responsive to detected optical power. In some examples, photo-signals are represented as voltages V for convenience as in many practical applications, photo-signals are processed as voltages. However, photo-signals can be based on light induced currents, voltages, or resistances, depending on photodetector type and circuit arrangement.

Optical radiation refers to propagating electromagnetic radiation at wavelengths between about 100 nm and 1 mm. In some cases, optical radiation is referred to as propagating with a confined volume and is referred to an optical beam. Optical power refers to energy per unit time associated with an optical beam and is thus proportional to a square of the associated electrical field.

As noted above, a static calibration or compensation coefficient refers to a value which provides photo-signal compensation such as linearization independent of average values of photo-signal; a dynamic calibration or compensation coefficient refers to a value which provides photo-signal compensation such as linearization based on variation in average photo-signal, typically based on determining a dependence of one or more static calibration coefficients on average photo-signal.

Example 1. Compensated Detector FTIR

Referring to FIG. 1, a representative FTIR system 100 includes an optical source 102 that directs an optical beam to a beam splitter 104 which delivers beam portions 105A, 105B to respective reflectors 106, 108 which reflect the beam portions 105A, 105B back to the beam splitter 104 to form a combined beam 105C. A sample 112 is situated in the path of the combined beam 105C which is incident to a detector 110 such as an MCT detector. A stage 114 is coupled to the reflector 106 to vary an optical path length between the beam portions 105A, 105B, typically by continuous or stepwise scanning. Scanning is initiated in response to processor-executable instructions stored in a portion 118 of processor-readable storage device provided a part of a control system 120 that also includes a CPU or other programmable or dedicated processor hardware such an FPGA, CPLD, or ASIC. In this example, the control system 120 is coupled to the photodetector 110 and receives a photo-signal 111 associated with scanning of the reflector 106. In this example, the photo-signal 111 is digitized at an analog-to-digital convertor (ADC) 122 and a digital photo-signal 123 is then linearized or compensated using processor-executable instructions and calibration parameters stored in a portion 124 of the processor-readable storage device.

A digitized photo-signal associated with a scan can be referred to as an interferogram or as a linearized or compensated interferogram if compensation has been applied. For a sample scan associated with N optical path length differences, interferograms comprise a series of N photo-signal values $IG_S(n)$, $n=0, \ldots, N-1$ for N optical path length differences. In some examples, digitization and linearization or other compensation processing can be performed prior to delivering the photo-signal to the controller system 120. In some cases, the photodetector is part of a detection system that provides suitable electrical biases (if needed) to the photodetector 110 and includes an ADC to provide a digital photo-signal to the control system 120. Linearization parameters can be stored in the and retrieved from the portion 124 of the processor-readable storage device by the controller 120. The linearized photo-signal 125 (interferogram) is then Fourier transformed using processor-executable instructions stored in a portion 128 of the processor-readable storage device to produce a sequence of values $FFT_K(IG_S)$, wherein K is an integer, generally $K=0, \ldots, N/2-1$ to correspond with $I(G_S)$. In most applications, a background scan without a sample is performed and a corresponding background photo-signal obtained (i.e., a background interferogram $IG_B(n)$) and Fourier transformed. Ratios $FFT_K(IG_S)/FFT_K(IG_B)$ of corresponding components of the Fourier transforms of the linearized sample photo-signal and the background photo-signal are obtained and provided as FTIR system spectral output.

The sample 112 is generally removable from a path of the combined beam so that the sample 112 can be withdrawn to perform the background scan. In some applications, an evacuated sample cell can be used or a sample cell filled with a preferred material. Although FIG. 1 illustrates transmission FTIR, in other examples, an optical beam is reflected from a sample surface, totally internally reflected in the sample, or interacts with a sample in some other way. In addition, linearization of a detector such as an MCT detector for FTIR is only an example of the disclosed approaches and these approaches can be used with other measurement systems, detectors, and in other wavelength ranges.

Example 2. Linearization with Static Coefficients

Photodetector compensation such as linearization can be provided in some examples by selecting one or more static or dynamic calibration coefficients. For example, an MCT photodetector can be linearized using an exponential function, $$f_{cal}(V_{mct}) = a_{cal} e^{b_{cal} V_{mct}} + c_{cal},$$

wherein $a_{cal}$, $b_{cal}$ and $c_{cal}$ are static calibration coefficients, $f_{cal}$ is compensated (typically linearized) photodetector output signal, and $V_{mct}$ is photodetector output signal without compensation. More generally, using such calibration coefficients, a series of photo-signal values $I_n$ for $n=0, \ldots, N-1$ can be linearized to produce a series of linearized photo-signal values $I_n^L$ wherein $$I_n^L(I_n) = a_{cal} e^{b_{cal} I_n} + c_{cal}.$$

The photo-signals $I_n$ can correspond to electrical currents, voltages, resistances, or other electrical characteristics responsive to an optical beam. The photo-signals $I_n$ can be processed signals associated with amplification, filtering, or other processes applied to the photodetector signals. In some examples, linearization or other processing is applied to include the effects of amplification, filtering, or other processing. By performing calibration using amplified photodetector signals, non-linearities or other response characteristics associated with amplification or other photodetector processing can be compensated along with response characteristics of a photodetector.

Figure 2:
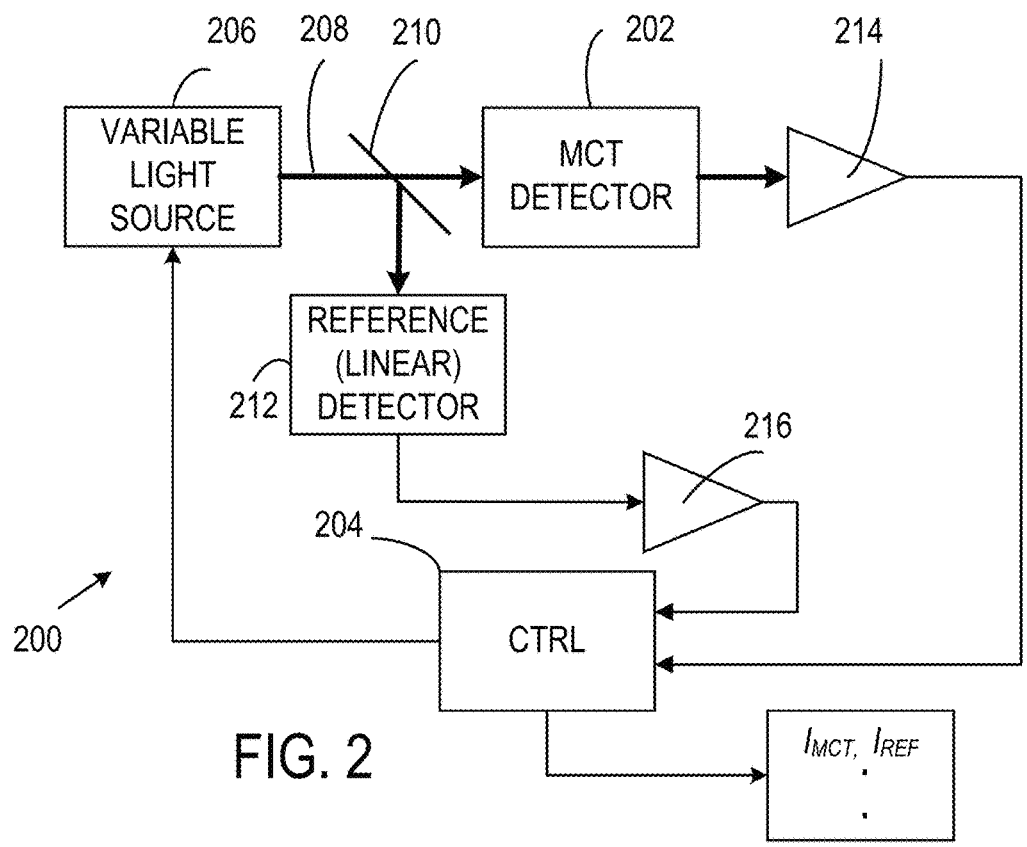
FIG. 2 illustrates a system for linearizing a photodetector based on a reference photodetector.

FIG. 2 illustrates a representative system 200 for linearization of an MCT photodetector 202. The system 200 includes a controller 204 that is coupled to a variable light source 206 that produces an optical beam 208 that is incident to beam splitter 210. The beam splitter 210 directs respective portions of the optical beam 208 to the MCT detector 202 and a reference detector 212 that produces a reference photo-signal that is proportional to optical power detected at the reference detector 212. The reference detector 212 can be a photodiode or other detector that produces suitable proportional output or a detector which in combination with calibration circuitry produces a proportional output. Photo-signals produced by the MCT 202 and the reference detector 212 are coupled to respective amplifiers 214, 216 or other amplifying, buffering, or filtering circuitry and corresponding photo-signals delivered to the controller 204.

The controller 204 is operable to vary the power of the optical beam 208 and receive the corresponding varying photo-signals associated with the MCT detector 202 and the reference detector 212. In some examples, the optical beam power produced by the variable light source 206 is periodically modulated such as sinusoidally modulated so that the optical beam 208 is associated with a range of optical powers. The controller 204 can include an analog-to-digital convertor and a processor-readable storage device so that the input photo-signals are digitized and stored as reference photo-signal amplitudes $I_{REF}$ and MCT photo-signal amplitudes $I_{MCT}$ such as illustrated in FIGS. 2A and 2B, respectively. FIG. 2A shows a substantially sinusoidal response of the reference detector 212 to a sinusoidal modulation of the optical beam 208 and FIG. 2B shows the corresponding response of the MCT detector to the same sinusoidal modulation, exhibiting distortion. FIG. 2C is a graph with $I_{ref}$ and $I_{MCT}$ plotted with respect to each other showing that the photo-signal produced with MCT detector 208 deviates from the linear response of the reference detector 212. With a linear response, the plot of $I_{REF}$ and $I_{MCT}$ would be a straight line. MCT detector linearization can be provided by curve fitting the values of $I_{MCT}$ to the linear response values $I_{REF}$ as discussed in detail below.

The optical beam power of the optical beam 208 can be varied step-wise, have other periodic or aperiodic modulations including sawtooth and triangular modulations, and/or have a variable or fixed DC offset.

Example 3. Linearization with Static Calibration Coefficients

Figure 3A:
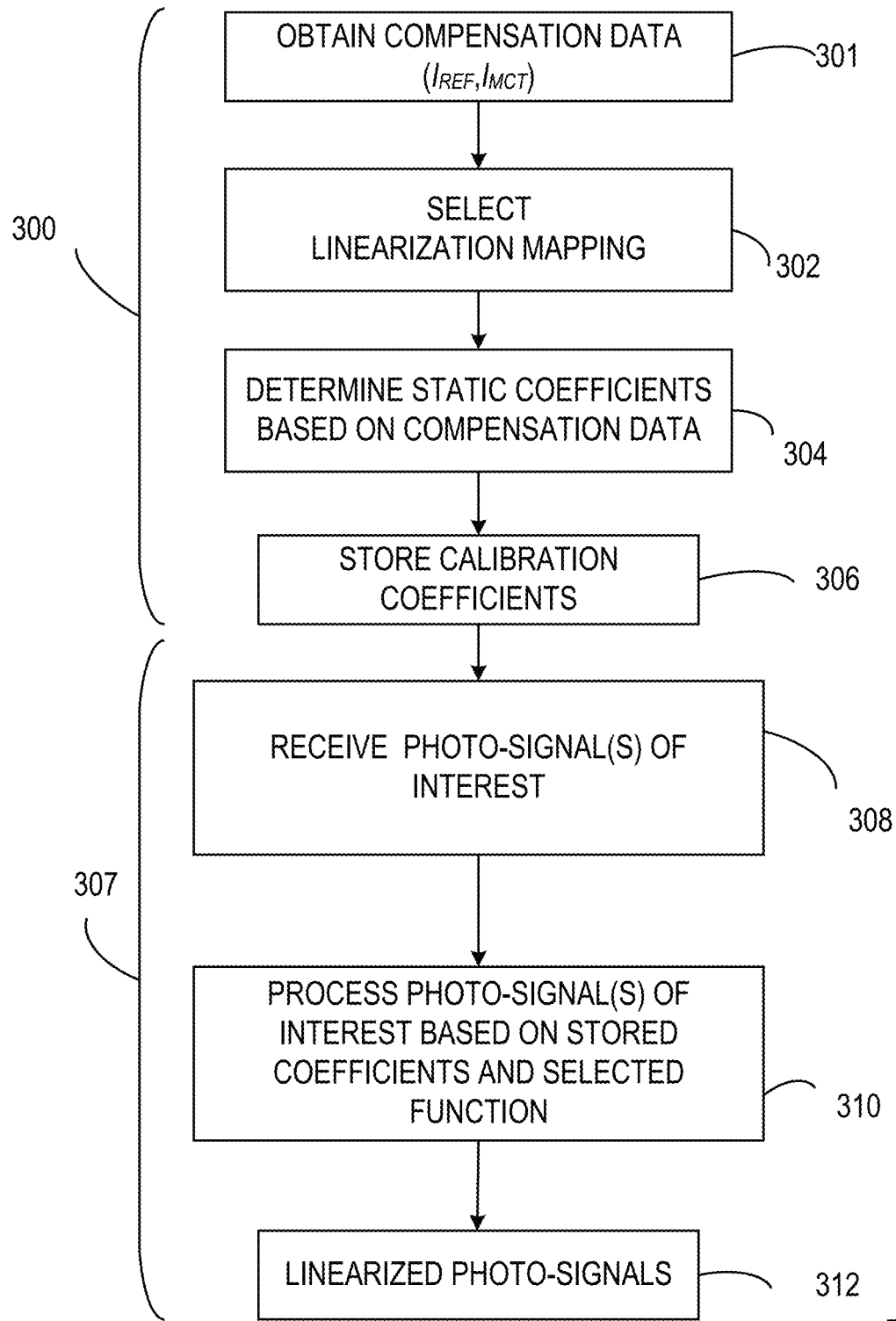
FIG. 3A illustrates a representative method of establishing static photodetector calibration coefficients and linearization of photo-signals based on the calibration coefficients.

Referring to FIG. 3A, a representative method 300 of linearizing photo-signals to be proportional to detected optical power includes obtaining compensation data at 301 such as $I_{REF}$, $I_{MCT}$ discussed above. While it is convenient that $I_{REF}$ is a linear function of detector optical signal, other known responses can be used. At 302, a linearization function $f$ is selected such as an exponential, polynomial, Bezier curve, or function. A particular analytical format such as a continuous function is convenient so that compensation of arbitrary photo-signals can be obtained for all values but some or all selected data pairs $(I_{ref}, I_{MCT})$ can be used to provide linearization for selected values of $I_{MCT}$ and other values determined by, for example, interpolation. At 304, the compensation data is processed by curve fitting to $f$ or otherwise so that any coefficients that define the compensation function are determined. For example, if the compensation function $$f(I_{MCT}) = a_{cal} e^{b_{cal} I_{MCT}} + c_{cal} I^L(I_{MCT}),$$

is selected, wherein $I^L(I_{MCT})$ is the linearized photo-signal value associated with $I_{MCT}$, the static calibration coefficients $a_{cal}$, $b_{cal}$ and $c_{cal}$ are determined by curve fitting such as using a least squares fitting procedure to minimize $\Sigma_0^{N-1}(I_{MCT}-I_{Ref})^2$. Then $f(I_{MCT})=I^L((I_{MCT})$ is a linearized photo-signal obtained from the uncompensated photo-signal $I_{MCT}$. At 306, one or more of the constant calibration coefficients $a_{cal}$, $b_{cal}$ and $c_{cal}$ are stored in a memory device.

The constant calibration coefficients $a_{cal}$, $b_{cal}$ and $c_{cal}$ can be used as further shown in FIG. 3A. A representative method 307 of linearization includes receiving one or more photo-signals of interest at 308 and processing these photo-signals at 310 using the compensation function $f$ by computations using the calibration coefficients $a_{cal}$, $b_{cal}$ and $c_{cal}$ or a look-up table corresponding to the calibration function and interpolation procedures retrieved from a processor-readable storage device. At 312, linearized values $I^L$ ($I_{MCT}$) are output.

Example 4. Linearization with a Reduced Set of Calibration Coefficients

In some applications, average photo-signal values are not of interest or are removed by filtering to remove a DC component. In these applications, linearized photo-signals $I^L$ can be produced as $I^L (I_{MCT})=a_{cal}e^{b_{cal}I_{MCT}}$ as the contribution associated with $c_{cal}$ is either removed by the filtering or is otherwise not of interest. For these applications, only $a_{cal}$ and $b_{cal}$ can be used and only these values are stored and/or retrieved.

In systems using ratio-based measurement, further simplifications are possible. In such systems, photo-signals associated with a sample under investigation and a reference are obtained, i.e., a series of photo-signal values as $I_n^S$ associated with the sample and a series of photo-signal values $I_n^{Ref}$ associated with the reference are obtained. Linearized sample and reference photo-signal values include the value $a_{cal}$ as a factor so that any application of the value $a_{cal}$ in linearization is effectively removed in the ratio $I_n^{L,S}/I_n^{L,Ref}$, wherein $$I_n^{L,S} = a_{cal}e^{b_{cal}I_n^S} \text{ and } I_n^{L,Ref} = a_{cal}e^{b_{cal}I_n^{Ref}}$$

are the linearized photo-signal values associated with the sample and the reference, respectively.

In some applications, the sample and reference photo-signal values are processed in ways other than just as a simple ratio. For example, in FTIR spectroscopy the photo-signals associated with both a sample and a reference are Fourier transformed and the sample spectrum of interest is obtained as a ratio of corresponding components of the respective FFTs. In these applications, the calibration constant $a_{cal}$ is also effectively removed by the FFT ratio and thus need not be applied in linearization and need not be stored for such use.

Figure 3B:
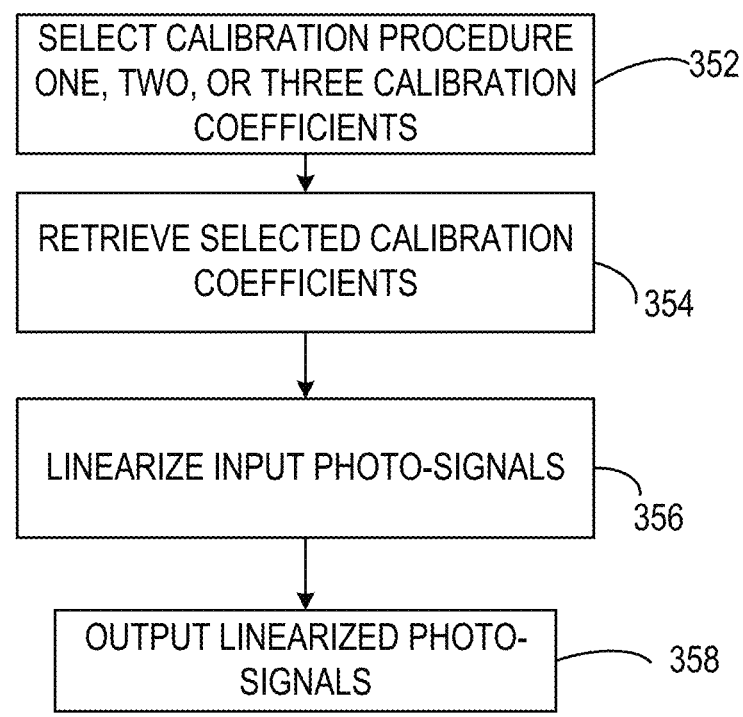
FIG. 3B illustrates a representative method of linearizing photo-signals based on selected calibration coefficients.

For example, as shown in a method 350 in FIG. 3B, at 352 a calibration procedure is selected based on one, two, or three calibration coefficients. At 354 the selected calibration coefficients are retrieved from a processor-readable storage device and at 356 used to linearize one or more input photo-signals. At 358, linearized signals are output.

Example 5. Dynamic Calibration

The constant (or static) calibration approaches described above can significantly reduce photo-signal and/or photodetector nonlinearities but do not compensate for heating or other changes in the photo-signal or photodetector in response to an input beam. For example, a change in photodetector temperature can be associated with shifts in calibration coefficient values. In some applications, such shifts are acceptably small and the static calibration coefficient values are sufficient. To address shifts in calibration coefficient values in response to an input, calibration coefficient values can be refined based on a total photo-signal. The total photo-signal can be viewed as associated with a total heat load applied to the photodetector and referred to as an effective energy $E_{eff}$ that can be obtained as a sum or mean of N photo-signal values $I_k$ as:

$$E_{eff} = \frac{1}{N}\sum_{k=0}^{N-1}I_k.$$

Other approaches to estimating $E_{eff}$ can be used such as using acquired photo-signal values from previous measurements. This approach is particularly suited for FTIR using continuous scans in which signal values do not change rapidly from scan to scan. Alternatively, in FTIR systems, photo-signals associated with optical delays far from zero path difference can be used as approximations to an average value. However, in order to obtain $E_{eff}$, DC photo-signal values must be obtained and photo-signals must include a DC component at least one location in processing so that $E_{eff}$ is available. As discussed above, compensation can include effects due to photodetection electronics such as amplifiers and filters, and not just photodetectors. The photo-signal values used to establish $E_{eff}$ are obtained within a suitable interval to correspond to current photodetector temperature or other photodetector or processing circuitry effects associated with a measurement of interest.

As discussed above, linearization can be based on one, two, or three calibration coefficients when using an exponential function. In one example discussed above, only the calibration coefficient $b_{cal}$ is used. This approach is particularly suitable for applications in which DC or average values are not of interest and a ratio to a reference measurement is used. For calibration using only the calibration coefficient $b_{cal}$, DC values are needed to determine $E_{eff}$ for dynamic compensation, but these DC values are not otherwise required. In this example, the calibration coefficient $b_{cal}$ can be dynamically compensated as:

$$b_{cal}(E_{eff})=a_{dbCal}E_{eff}+b_{dbCal},$$

wherein $a_{dbCal}$ and $b_{dbCal}$ are dynamic calibration coefficients for use in dynamic compensation of the calibration coefficient $b_{cal}$ and do not correspond to acai and $b_{cal}$ used above. To determine $b_{cal}(E_{eff})$, the values of these additional calibration coefficients must be estimated. In one approach, an optical beam with a DC and a modulated component can be directed to the detector under test. Varying the DC component permits variation of $E_{eff}$ and the modulated component permits determination of the calibration coefficients $a_{cal}$, $b_{cal}$ and $c_{cal}$ at the at a plurality of values of $E_{eff}$. A curve fit such as discussed above can be used.

Figure 4:
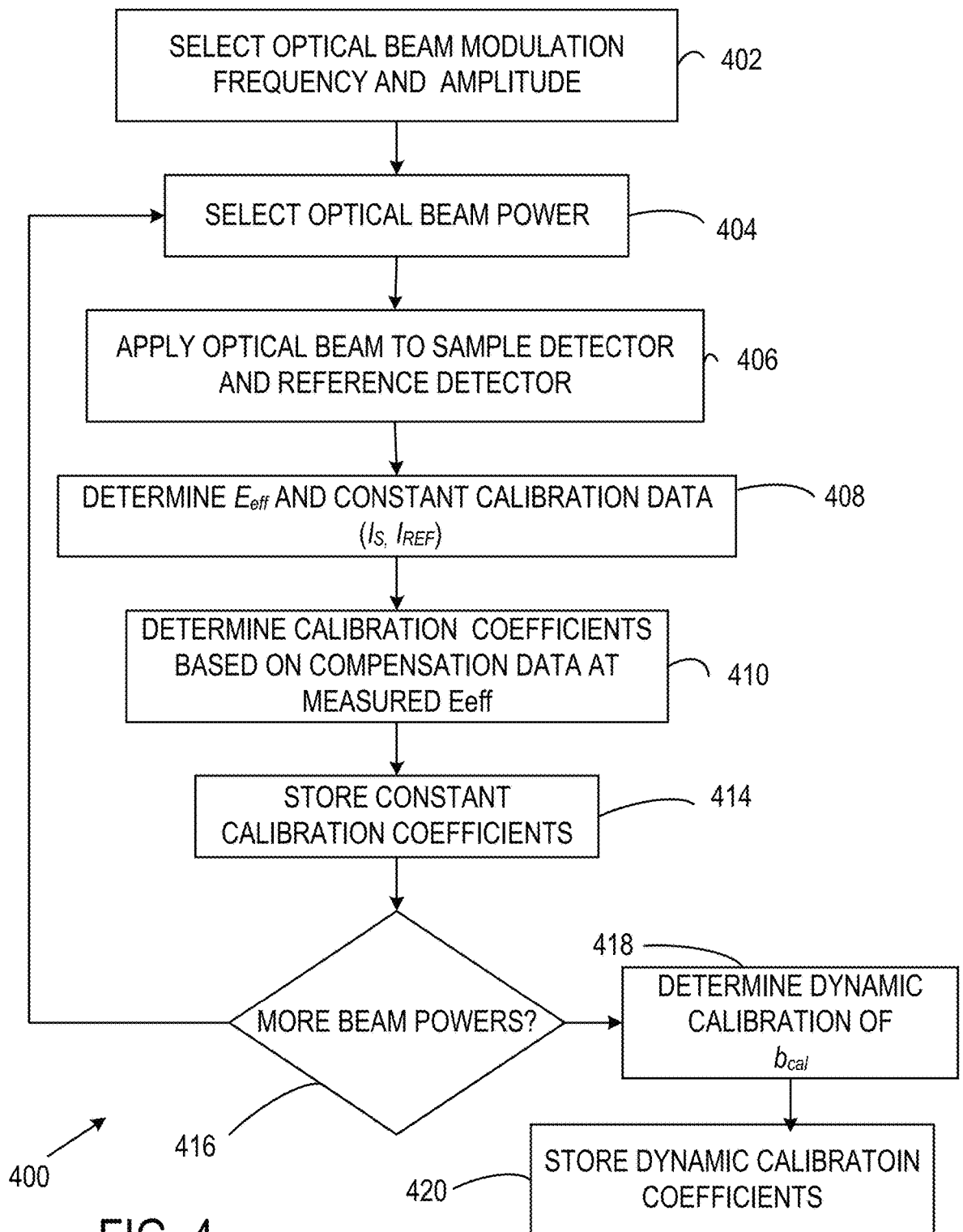
FIG. 4 illustrates a representative method of establishing dynamic photodetector calibration coefficients.
Figure 4A:
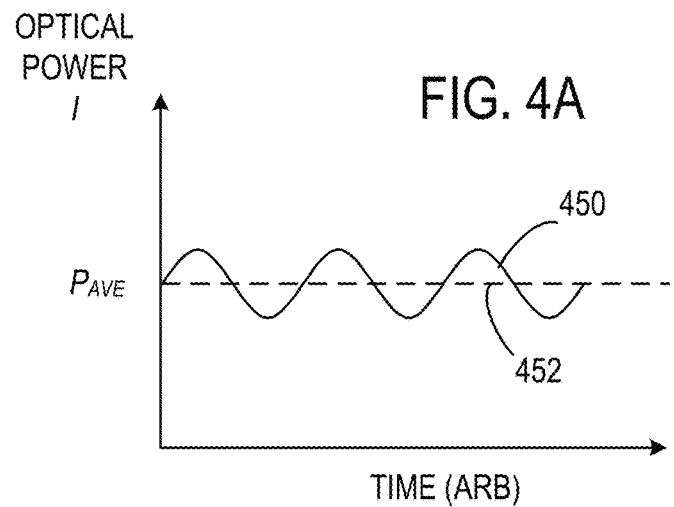
FIG. 4A illustrates a representative optical beam modulation for use in dynamic calibration.

Referring to FIG. 4. a representative method of determining one or more dynamic calibration coefficients 400 includes selecting an optical beam modulation amplitude and frequency at 402. These are generally selected to be at or near ranges for which a detector is to be used. At 404, an average optical beam power $P_{AVE}$ is selected, and at 406, an optical beam with the selected modulation and average optical beam power is applied to a sample detector and reference detector. A typical optical beam modulation is illustrated in FIG. 4A, showing a modulated component 450 and an average (or DC) value $P_{AVE}$ at 452. At 408, photo-signals associated with the sample detector and the reference detector $IS(t_j)$, $I_{REF}(t_j)$, respectively, are measured for a plurality of times $t_j$. At 410, one or more calibration coefficients are determined as discussed above using $I_S(t_j)$ and $I_{REF}(t_j)$ along with an average photo-signal value which corresponds to $E_{EFF}$. At 414, the calibration coefficients and the associated $E_{EFF}$ are stored. At 416, it is determined if calibration data at additional values of optical beam power is needed. If so, the method returns to 404 for selection of optical beam power. If not, the selected calibration coefficients can be provided with dynamic calibration at 418.

Figure 4B:
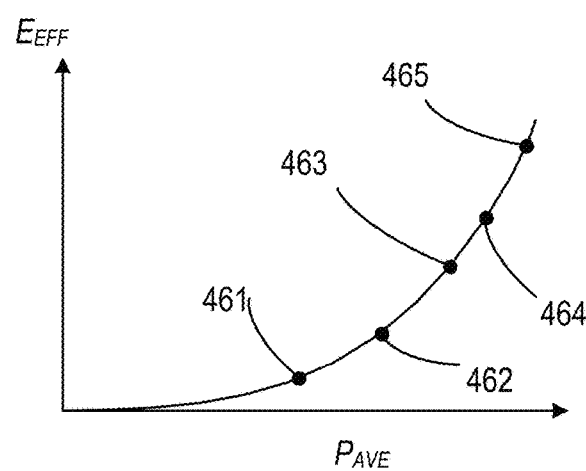
FIGS. 4B-4C illustrate data acquisitions associated with dynamic linearization.
Figure 4C:
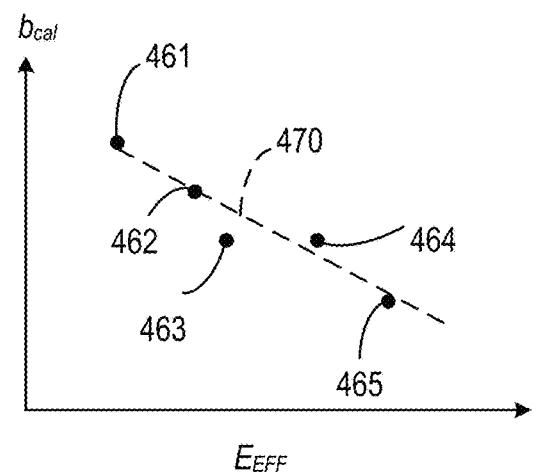

By varying average optical power, data sets can be acquired for varying values of $E_{EFF}$ as illustrated in FIG. 4B which shows $E_{EFF}$ values for data sets 461-465 acquired with different average optical powers. Each data set provides a set of one or more calibration coefficients for the associated $E_{EFF}$ (i.e., one or more of $a_{cal}$, $b_{cal}$ and $c_{cal}$). FIG. 4C illustrates variation of $b_{cal}$ as a function of $E_{EFF}$ for various values of $E_{EFF}$ associated with the data sets 461-465 along with a linear fit 470 which defines the dynamic calibration coefficients $a_{dCal}$ and $b_{dCal}$ that are stored at 420.

In other examples, two calibration coefficients are dynamically varied. In addition to $b_{cal}$ as shown above, $a_{cal}$ can be dynamically obtained as $$a_{cal}(E_{eff}) = a_{daCal} E_{eff} + b_{daCal},$$

wherein $a_{daCal}$ and $b_{daCal}$ are dynamic calibration coefficients for use in dynamic compensation of the calibration coefficient $b_{cal}$ with the same calibration data $I_S(t_j)$ and $I_{REF}(t_j)$ discussed above.

Figure 4D:
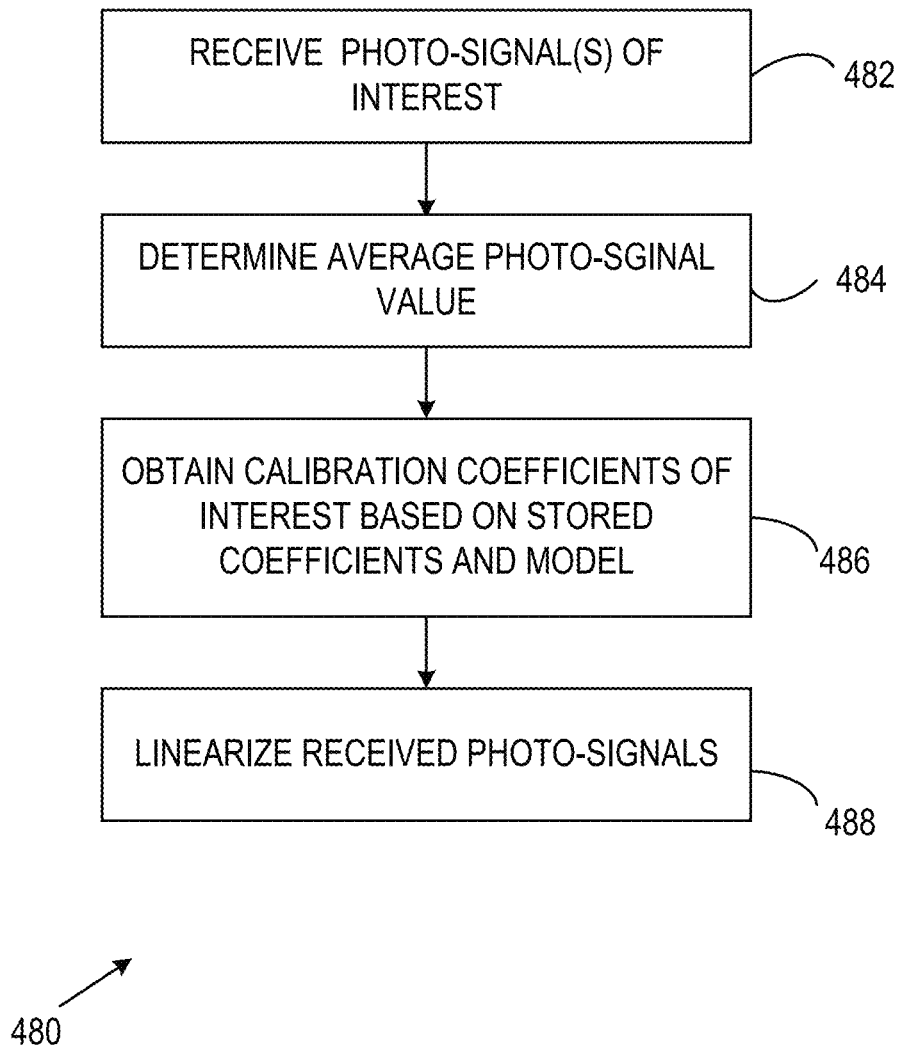
FIG. 4D illustrates a representative method of dynamic calibration.

A representative method of dynamic linearization 480 is illustrated in FIG. 4D. At 482, one or more photo-signals of interest are received and at 484 an average photo-signal value (corresponding to $E_{EFF}$) is obtained based on the received photo-signals, photo-signals from a prior, similar measurement, an electrical offset provided to one or more photo-signal amplifier circuits based on average photo-signal amplitude, or otherwise obtained. At 486, one, two, or more calibration coefficients can be retrieved from a look-up table in a processor-readable storage device or computed from retrieved values by interpolation or otherwise. One or more of $a_{cal}$, $b_{cal}$ and $c_{cal}$ can be adjusted based on the average photo-signal value. At 488, the received photo-signals are linearized using at least one dynamic calibration coefficient associated with the average value of the received photo-signal.

Example 6. Representative FTIR Measurement

In FTIR, a photo-signal associated a sample and a photo-signal associated with background are obtained so that a measured spectrum is reflective of the sample and not any unrelated effects included in the background. In FTIR, linearization can be performed without a full set of calibration coefficients. For example, a background interferogram vector $b = b_0, \ldots, b_{N-1}$ and a sample interferogram vector $s = s_0, \ldots, s_{N-1}$ are obtained, wherein each is a series of N photo-signal values. The background and sample interferograms can be corrected as discussed above using calibration coefficients. Corrected (i.e., linearized) values are represented using the symbol "^" so that $n^{th}$ elements of the linearized background and sample interferogram vectors are:

$$\hat{b}_n = a_{cal} e^{b_{cal} b_n} + c_{cal} \text{ and}$$

$$\hat{b}_n = a_{cal} e^{b_{cal} b_n} + c_{cal}$$

$$\hat{s}_n = a_{cal} e^{b_{cal} s_n} + c_{cal}$$

$$\hat{s}_n = a_{cal} e^{b_{cal} s_n} + c_{cal}$$

The average values can be removed by subtraction; the resulting vectors and elements are denoted with a "~" symbol, so that $$\tilde{\hat{b}}_n = a_{cal} e^{b_{cal} b_n} + c_{cal} - \frac{1}{N} \sum_{m=0}^{N-1} \left[ a_{cal} e^{b_{cal} b_m} + c_{cal} \right]$$

and $$\tilde{\hat{s}}_n = a_{cal} e^{b_{cal} s_n} + c_{cal} - \frac{1}{N} \sum_{m=0}^{N-1} \left[ a_{cal} e^{b_{cal} s_m} + c_{cal} \right].$$

These simplify to:

$$\tilde{\hat{b}}_n = a_{cal} \left( e^{b_{cal} b_n} + D_b \right),$$

wherein $$D_b = -\frac{1}{N} \sum_{m=0}^{N-1} e^{b_{cal} b_m}$$

and $$D_b = -\frac{1}{N} \sum_{m=0}^{N-1} e^{b_{cal} b_m}$$

$$\tilde{\hat{s}}_n = a_{cal} \left( e^{b_{cal} s_n} + D_s \right),$$

wherein $$D_s = -\frac{1}{N} \sum_{m=0}^{N-1} e^{b_{cal} s_m}.$$

Using uppercase letters to represent Fourier transforms, i.e., as vectors B and S, $k^{th}$ components of the Fourier transforms of the linearized, zero-mean background and the linearized, zero-mean sample interferograms are:

$$B_k = \sum_{n=0}^{N-1} \tilde{\hat{b}}_n e^{-j\frac{2\pi}{N}kn} = a_{cal} \sum_{n=0}^{N-1} \left( e^{b_{cal} b_n} + D_b \right) e^{-j\frac{2\pi}{N}kn}$$

and $$S_k = \sum_{n=0}^{N-1} \tilde{\hat{s}}_n e^{-j\frac{2\pi}{N}kn} = a_{cal} \sum_{n=0}^{N-1} \left( e^{b_{cal} s_n} + D_s \right) e^{-j\frac{2\pi}{N}kn}.$$

In FTIR, the ratio $T_k = S_k / B_k$ is the quantity of interest, and it is apparent that the common factor $a_{cal}$ cancels. For this reason, in FTIR, linearization of background and sample interferograms with average values removed can be performed as $f_{cal*}(i_k) = e^{b_{cal} i_k}$ wherein $i_k$ is a $k^{th}$ component of an interferogram or its Fourier transform.

Example 7. Representative Spectrometers

Figure 5:
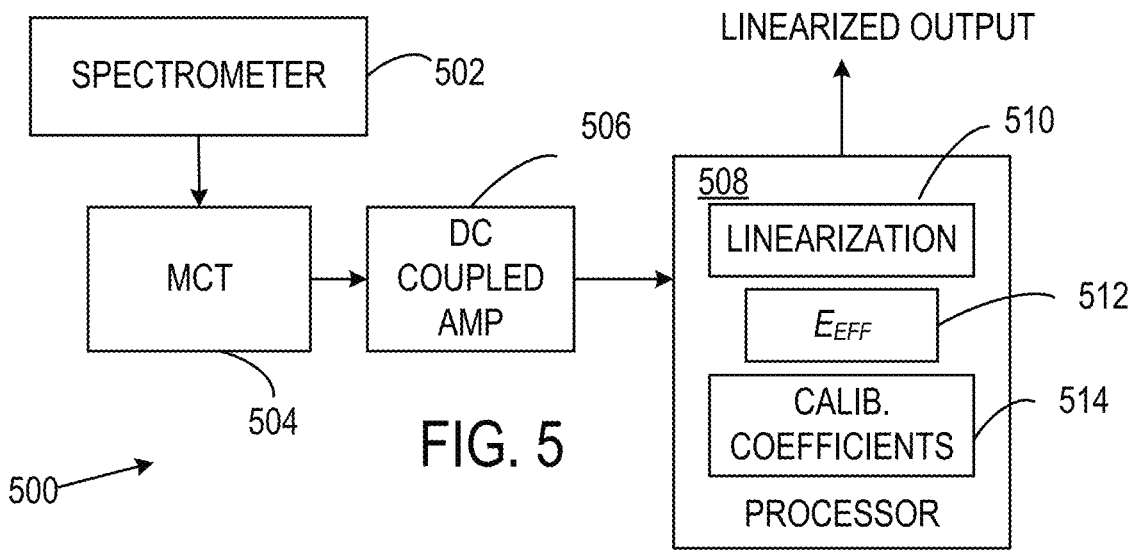
FIG. 5 illustrates a representative spectroscopy system that includes a processing system that provides linearized photo-signals.

Referring to FIG. 5, a compensated spectrometer system 500 includes a spectrometer 502 that couples a portion of an optical beam associated with spectral component to a detector 504 such as an MCT detector. The detector provides a photo-signal to a DC coupled amplifier 506 which provides an amplified and/or filtered photo-signal to a processing system 508 that can include an ADC (not shown), a processing device, and a processor-readable storage device that includes portions 510, 512, 514 for linearization, determining $E_{EFF}$, storing constant and/or dynamic calibration to provide a linearized output, with either dynamic or constant calibration, with one, two, or three calibration coefficients.

Figure 6:
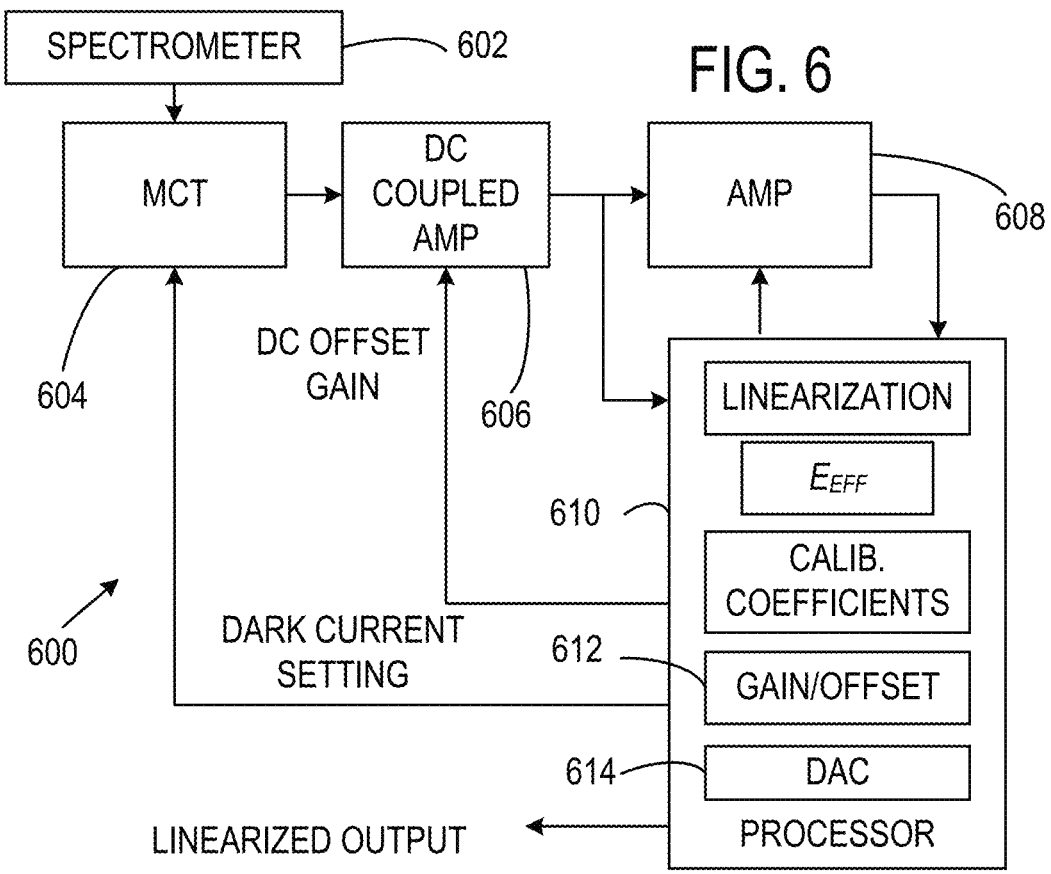
FIG. 6 illustrates a representative spectroscopy system that includes a processing system that provides linearized photo-signals and provides a current offset for reducing a DC component of a photo-signal prior to coupling for additional amplification.

FIG. 6 illustrates a compensated spectrometer system 600 that includes a spectrometer 602 similar to that of FIG. 5 and a first amplifier (a DC coupled amplifier) 606 coupled to a photodetector 604 such as an MCT photodetector. The amplifier 606 is coupled to a second amplifier 608 to direct a photo-signal to a processor system 610. In this example, the processor system 610 is coupled to establish a fixed output of the photodetector 604 when unexposed to any optical beam to reduce apparent signal contributions due to dark current. The processor system 610 also provides one or more control signals to the amplifier 606 via a Digital to Analog Convertor (DAC) 614 to select amplifier gain and offset using processor-executable instructions stored in a memory device, if desired. By adjusting offset and gain, the amplifier range can be used for the AC portion of the photo-signal and the associated digital photo-signal can use the full range. A photo-signal from the DC coupled amplifier 606 and any offset provided by the ADC 614 can be used to establish $E_{EFF}$ for dynamic calibration. The processing system 610 that can store calibration coefficients and processor-executable instructions for linearization, determining $E_{EFF}$, dynamic calibration, and selection of one, two, or three calibration coefficients.

Example 8. Representative Photo-Signal Amplifier

Figure 7:
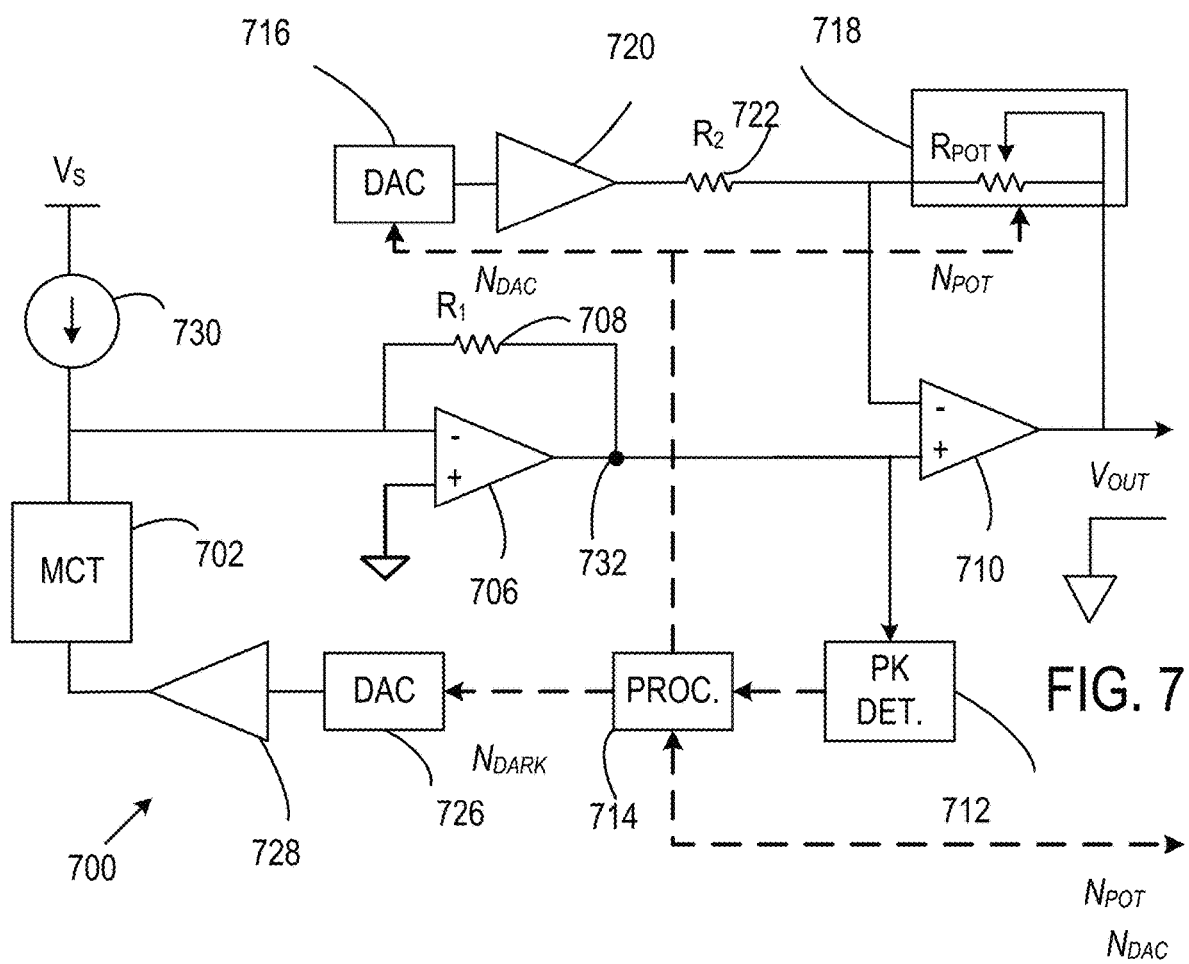
FIG. 7 is a schematic of a representative DC coupled amplifier suitable to provide photo-signals for dynamic or static linearization.

Referring to FIG. 7, a representative amplifier 700 for a use with a photodetector 702, includes a first op amp 706 and a resistor 708 arranged as a transimpedance amplifier based on a photo-current received from the photodetector 702. The resistance of the resistor 708 can be selected to provide a suitable voltage output for any detected optical signals. The first op amp 706 provides a photo-signal to a second op amp 710 that provides a photo-signal voltage output $V_{OUT}$. The first op amp 706 is also coupled to a peak detector 712 which provides an indication of peak photo-signal magnitude from the first op amp 706 as a digital signal to a processor 714. The processor 714 is coupled to a DAC 716 and a digital potentiometer 718 that establish an offset and gain provided by the op amp 710 via the digitally controller resistant $R_{POT}$; the DAC output is coupled to a buffer amplifier 720 and to the digital potentiometer 718 via resistor 722; the gain is based on the ratio $R_{POT}/R_2$ (For purposes of explanation, dashed lines indicate digital signal paths.) Offset can be set to have a small magnitude and gain set so that the photo-signal magnitude matches the available digital and/or analog voltage ranges, including the range associated with any downstream ADCs, although additional gain stages can be used if desired.

The processor 614 is also coupled to provide a digital offset signal to a DAC 726 that provides an analog offset signal to a buffer amp 728. This digital offset signal is associated with photodetector signal in the absence of an input optical signal and serves to remove at least partially dark current from the photo-signal received at the first op amp 706. The photodetector 702 is coupled to a supply voltage Vs and an associated bias current 730 that is produced can be offset with a suitable digitally controlled offset voltage.

The output signal $V_{OUT}$ is typically digitized and linearized as disclosed above. In some examples, the transimpedance amplifier formed by the op amp 706 and the resistor 708 is typically sufficiently linear that any nonlinearities at reference node 732 are due to the photodetector 702. Gain between the photodetector and the reference node is fixed; the calibration coefficients can be measured with respect to the reference node 732. The output $V_{OUT}$ is a function of digital gain and offset signals applied to the digital potentiometer 718 and the DAC 716, respectively so that the output signal $V_{OUT}$ can be back-calculated to a provide a photo-signal value at the reference node 732 for use in linearization. Linearization can be based on this node, with calibration data associated with this node.

As shown in FIG. 7, the output voltage, $V_{OUT}$ is given by $V_{OUT}=V_{OS}G_{OS}+V_{RN}G_{SIG}$, wherein $V_{OS}$ is the offset voltage, i.e., the voltage provided by the DAC 716, $G_{OS}$ is the offset gain, i.e., the gain from the DAC 716 to the output of the op amp 710, $V_{RN}$ is the voltage at the reference node 732, and $G_{SIG}$ is signal gain from the reference node 732 to the output of the op amp 710. It can be seen that $G_{OS}$ and $G_{SIG}$ are given by $$G_{OS} = \left(1 + \frac{R_{POT}}{R_2}\right) \text{ and } G_{SIG} = -\frac{R_{POT}}{R_2},$$

respectively. The resistance $R_{POT}$ is a function of the digital control signal $N_{POT}$ so that both $G_{OS}$ and $G_{SIG}$ are variable. The back-calculated reference node voltage $V_{RN}$ is then:

$$V_{RN} = V_{OUT}\frac{1}{G_{SIG}} - \frac{V_{OS}G_{OS}}{G_{SIG}}.$$

Linearization as discussed above is applied to $V_{RN}$ with one or more static and/or dynamic calibration coefficients obtain for the reference node 732.

The DAC 716 receives a control signal (such as control word $N_{DAC}$) and the digital potentiometer 718 receives a control signal (such as control word $N_{POT}$) from the processor 714 to establish $V_{OS}$ and $R_{POT}$, respectively. In an example, the control words establish $V_{OS}$ and $R_{POT}$ as $$V_{OS} = \frac{V_{ref}}{2^k}N_{DAC} \text{ and } R_{POT} = \frac{R_{max}}{2^m}N_{POT},$$

respectively, wherein $R_{MAX}$ is a maximum resistance obtainable and m is a bit resolution of the digital potentiometer 718, and $V_{REF}$ is a reference voltage of the DAC and k is a bit-resolution of the DAC 716. With these digital signals, the back-calibration can be completed. In addition, $V_{OS}$ and $R_{POT}$ can be set to reduce a DC component in $V_{OUT}$ and set the gain provided by the second op amp 710.

Linearization can be done by the processor 714 or other processor, and $V_{OUT}$, $N_{POT}$, and $N_{DAC}$ provided along with other parameters, as needed if gain and offset are to be calculated elsewhere.

Example 9. Representative Photo-Signal Amplifier with Current Injection

In many examples, for linearity correction, a DC-coupled amplifier is needed because the DC component of the modulated optical signal incident to the photodetector is large. However, in FTIR measurements, the DC component has little to no analytical interest to the spectroscopist. Accordingly, in alternative amplifier configurations, a DC component of opposite magnitude to the DC photo-signal component is introduced in the signal chain in addition to the offset $V_{OS}$ discussed above. This introduced DC component can ensure that an amplifier stage such as a first stage does not saturate. A first stage amplifier is generally a transimpedance amplifier due to its superior linearity, but such amplifiers typically have limited current drive capability which limits how small the transimpedance amplifier feedback resistor (e.g., $R_1$ in FIG. 7) can be. This, in turn, means that there is a minimum practical gain for the first stage. Combined with a large DC photo-signal component with a small, superimposed interferogram, amplifier saturation may be possible, especially for hot samples in which an additional DC component is produced.

Figure 8:
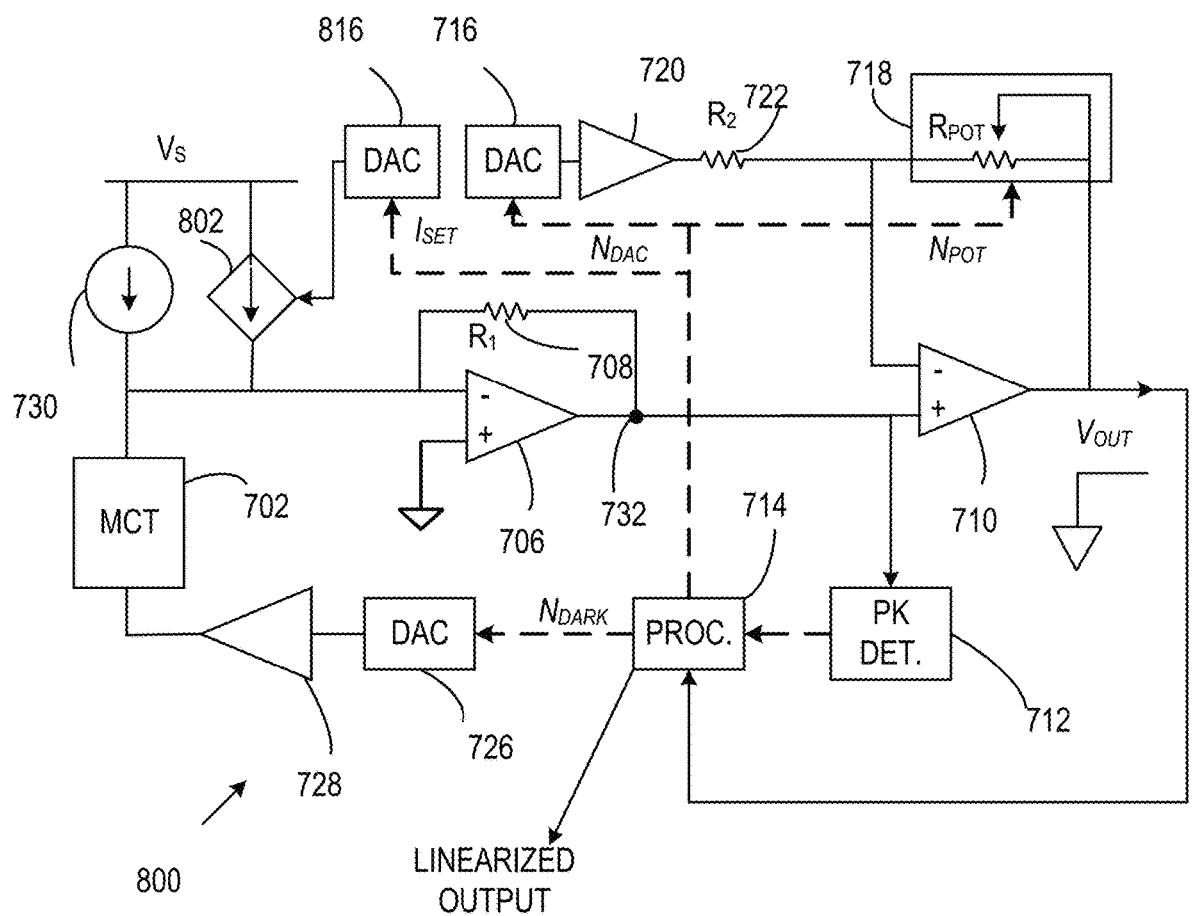
FIG. 8 is a schematic of an alternative representative DC coupled amplifier suitable to provide photo-signals for dynamic or static linearization.

An amplifier system 800 shown in FIG. 8 can addresses possible transimpedance amplifier saturation. The amplifier system 800 is similar to that of FIG. 7 but includes a current source 802 that injects a current $I_{SET}$ along with the photodetector current to the op amp 706 as controlled by a DAC 816. If introducing this current offset to the photodetector current is not needed, current injection can be disabled. The current $I_{SET}$ offsets the DC portion of the photocurrent and is added to voltage $V_{RN}$ (i.e., $V_{OUT}$ referenced back to the reference node 732) as a product $R_1 I_{SET}$ before applying linearization. In this configuration, $V_{OS}$ can generally be set to zero. The amplifier system 800 is illustrated as providing linearized output from the processor, but linearization can be provided at a remote processing system that receives $V_{OUT}$ along with $N_{DAC}$, $N_{POT}$, $V_{REF}$, and $I_{SET}$ or other parameters needed for back calculation to the reference node 732.

Example 10. Representative Linearization Method with Back-Calculation

Figure 9:
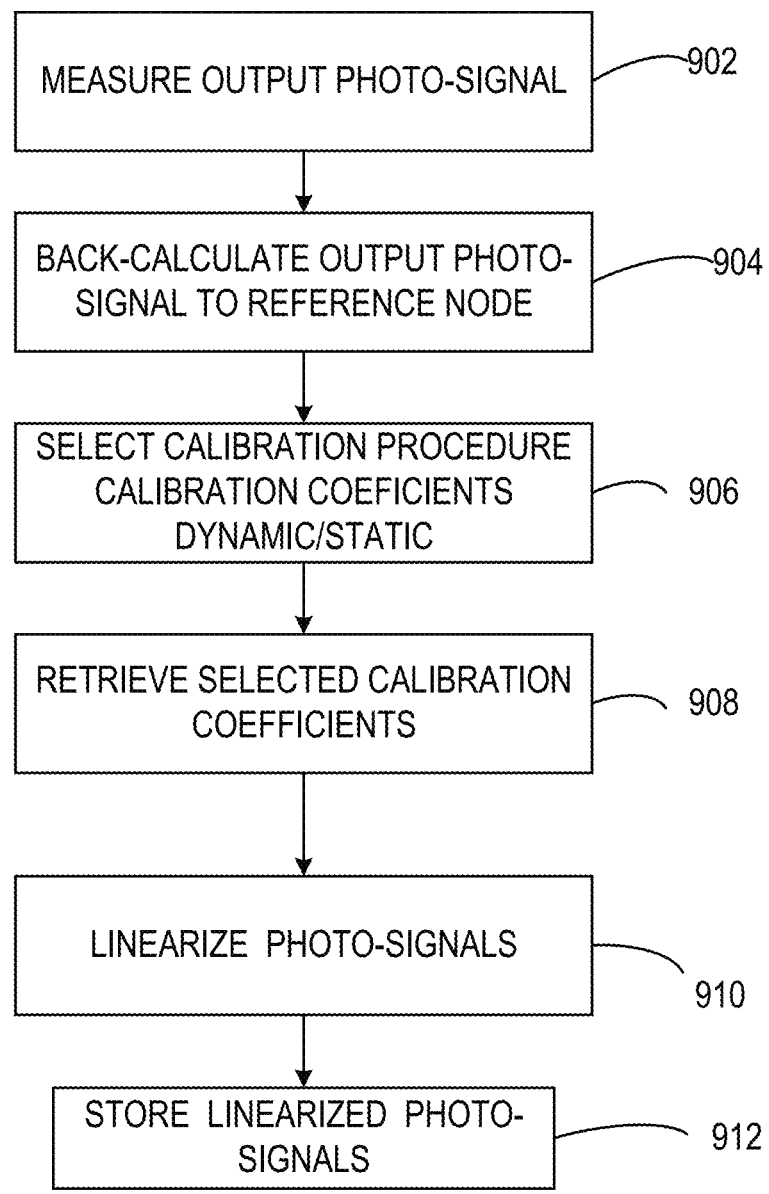
FIG. 9 illustrates a representative method of dynamic or static photodetector calibration based on back-calculation to a reference node.

Referring to FIG. 9, a method 900 includes measuring an output photo-signal at 902 and back-calculating photo-signal amplitudes to a reference node at 904. This back-calculation can be based on gains and/or offsets applied to the photodetector signal. At 906, a linearization method and corresponding linearization coefficients are selected such as those associated with one or multi-parameter static or dynamic compensation. At 908 the calibration coefficients are retrieved and at 910 the back-calculated photo-signal is linearized and stored at 912. In FTIR measurements, an FFT of the back-calculated photo-signal is computed and stored or displayed.

Example 11. Calibration with a Variable Light Source or Optical Attenuator

Figure 10:
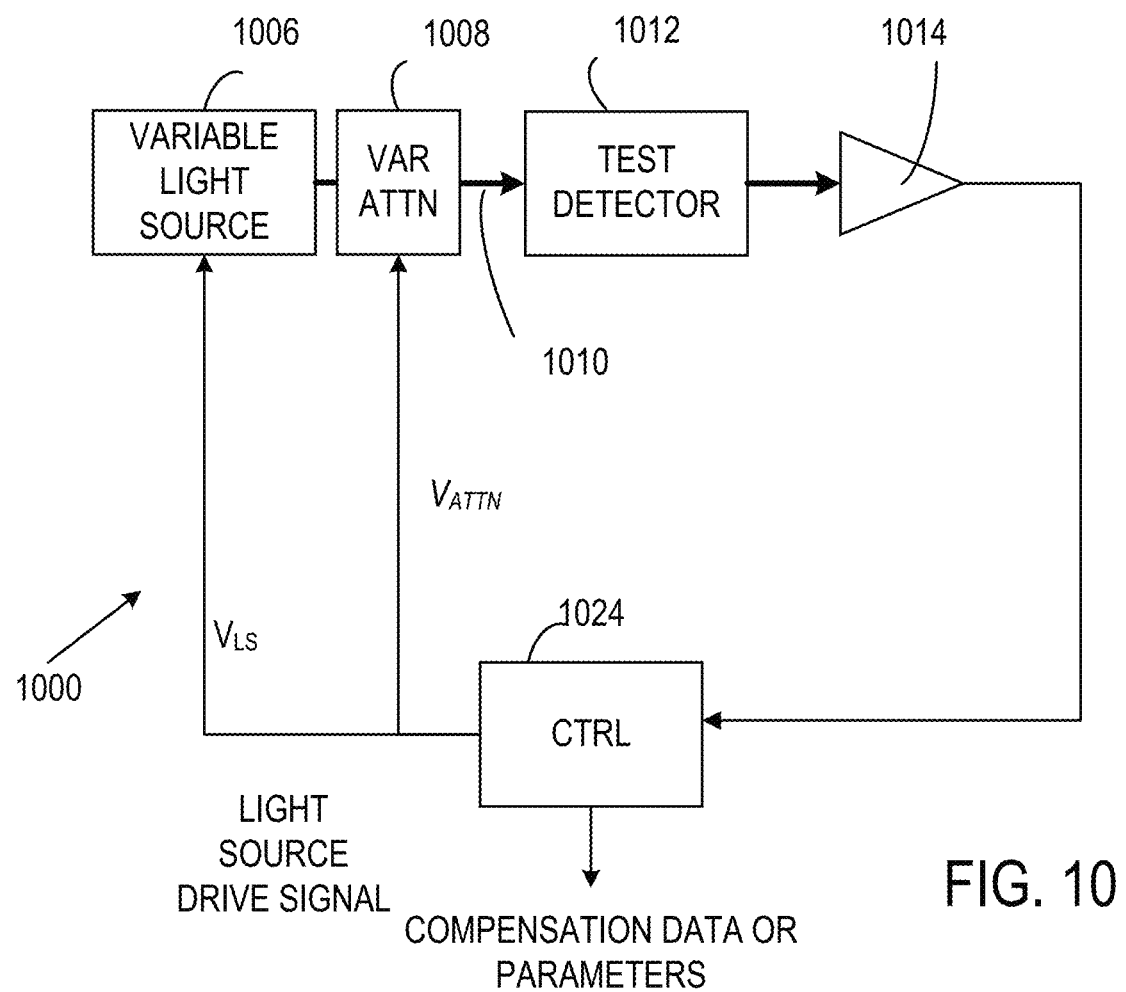
FIG. 10 illustrates a representative system for linearizing a photodetector using a variable optical attenuator or a variable light source.

Referring to FIG. 10, a representative photodetector calibration system 1000 includes a variable light source 1006 and/or a variable optical attenuator 1008 coupled to a processor system 1004 that is operable to vary optical power in an optical beam 1010 with respective control signals such as control voltages $V_{LS}$, $V_{ATTN}$, respectively. The optical beam 1010 is directed to a test photodetector 1012 which produces a photo-signal that is directed to an amplifier 1014 and a corresponding amplified photo-signal is coupled to the processor 1014, typical to an ADC to provide a digital photo-signal having values that can be stored in a memory device processor 1024 along with associated values of $V_{LS}$ or $V_{ATTN}$ that can be used in any of the calibration procedures disclosed above.

Representative Examples

Example 1 is a method, including: directing a modulated optical beam to a test photodetector; obtaining a modulation amplitude of a photo-signal associated with detection of a first portion of the modulated optical beam by the test photodetector; based on the modulation amplitude of the photo-signal from the test photodetector, determining at least one first calibration coefficient operable to linearize the test photodetector; and storing the at least one first calibration coefficient in a memory device.

Example 2 includes the subject matter of Example 1, and further includes: directing a second portion of the modulated optical beam to a reference photodetector; obtaining a modulation amplitude of a photo-signal associated with detection of the second portion of the modulated optical beam by the reference photodetector; and based on the modulation amplitudes of the photo-signals from the test photodetector and the reference photodetector, determining the at least one first calibration coefficient.

Example 3 includes the subject matter of any of Examples 1-2, and further specifies that the modulation of the optical beam is established based on a variable activation of an optical source that produces the optical beam or a variable attenuator placed in the path of the optical beam from the optical source, and the at least one calibration coefficient is determined based on the modulation amplitude of the photo-signal from the test photodetector and the variable activation of the optical source or the variable attenuation.

Example 4 includes the subject matter of any of Examples 1-3, and further specifies that the photo-signal is a photodetector signal.

Example 5 includes the subject matter of any of Examples 1-4, and further specifies that the at least one first calibration coefficient comprises only one first calibration coefficient.

Example 6 includes the subject matter of any of Examples 1-5, and further specifies that the at least one first calibration coefficient comprises three first calibration coefficients associated with linearization based on an exponential function having an offset.

Example 7 includes the subject matter of any of Examples 1-6, and further specifies that the at least one first calibration coefficient comprises calibration coefficients a, b, c, wherein a linearized photo-signal is produced as $I_{LINEAR}=\mathrm{aexp}(bI_{MEAS})+c$, wherein $I_{LINEAR}$ is the linearized photo-signal associated with a measured photo-signal $I_{MEAS}$.

Example 8 includes the subject matter of any of Examples 1-7, and further specifies that the at least one first calibration coefficient comprises a first calibration coefficient b, wherein a linearized photo-signal is produced as $I_{LINEAR}=\exp(bI_{MEAS})$, wherein $I_{LINEAR}$ is the linearized photo-signal associated with a measured photo-signal $I_{MEAS}$.

Example 9 includes the subject matter of any of Examples 1-8, and further specifies that the first calibration coefficients a, b, c are constants.

Example 10 includes the subject matter of any of Examples 1-9, and further includes: varying an average power of the modulated optical beam directed to the test photodetector; determining at least one second calibration coefficient based on the varying average power of the modulated optical beam, wherein the second calibration coefficient is at least one dynamic calibration coefficient associated with an average power dependence of a selected one of the first calibration coefficients; and storing the least one second calibration coefficient in the memory device.

Example 11 includes the subject matter of any of Examples 1-10, and further specifies that the at least one second calibration coefficient is associated with the calibration coefficient b.

Example 12 includes the subject matter of any of Examples 1-11, and further specifies that the at least one dynamic calibration coefficient comprises two calibration coefficients A and B such that the calibration coefficient $b=A(E_{\text{eff}})+B$, wherein $E_{\text{eff}}$ is associated with the average power of the modulated optical beam.

Example 13 includes the subject matter of any of Examples 1-12, and further includes linearizing a measured photo-signal as $I_{LINEAR}=\exp(bI_{MEAS})$, wherein $I_{LINEAR}$ is the linearized photo-signal associated with a measured photo-signal $I_{MEAS}$.

Example 14 is an FTIR system, including: a photodetector; a memory device storing at least one calibration coefficient associated with the photodetector; and a processor coupled to receive a photo-signal responsive to irradiation of the photodetector and linearize the photo-signal based on the at least one calibration coefficient.

Example 15 includes the subject matter of Example 14, and further specifies that the least one calibration coefficient includes one or more of calibration coefficients a, b, c, wherein a linearized photo-signal $I_{LINEAR}$ associated with a measured photo-signal $I_{MEAS}$ is produced as $I_{LINEAR}$ aexp$(bI_{MEAS})+c$.

Example 16 includes the subject matter of any of Examples 14-15 and further specifies that the least one calibration coefficient includes a calibration coefficient b, wherein a linearized photo-signal $I_{LINEAR}$ associated with a measured photo-signal $I_{MEAS}$ is produced as $I_{LINEAR}=\exp(bI_{MEAS})$.

Example 17 includes the subject matter of any of Examples 14-16, and further specifies that the memory device stores at least one dynamic calibration coefficient, wherein the processor linearizes the photo-signal based on the at least one calibration coefficient and the at least one dynamic calibration coefficient.

Example 18 includes the subject matter of any of Examples 14-17, and further specifies that the at least one dynamic calibration coefficient is associated with the calibration coefficient b.

Example 19 includes the subject matter of any of Examples 14-18, and further specifies that the at least one dynamic calibration coefficient comprises two dynamic calibration coefficients A and B such that the calibration coefficient $b=A(E_{\text{eff}})+B$, wherein $E_{\text{eff}}$ is associated with the average power of the modulated optical beam.

Example 20 includes the subject matter of any of Examples 14-19, and further includes linearizing a measured photo-signal as $I_{LINEAR}=\exp(bI_{MEAS})$, wherein $I_{LINEAR}$ is the linearized photo-signal associated with a measured photo-signal $I_{MEAS}$.

Example 21 includes the subject matter of any of Examples 14-20, and further includes a DC coupled amplifier coupled to the photodetector.

Example 22 includes the subject matter of any of Examples 14-21, and further specifies that: the amplifier includes a first amplifier and a second amplifier, wherein the first amplifier is a DC amplifier coupled to the photodetector; and the processor is coupled to provide a variable gain and offset to the second amplifier and linearize the photo-signal based on the at least one calibration coefficient and the variable gain and offset.

Example 23 includes the subject matter of any of Examples 14-21, and further specifies that $E_{\text{eff}}$ is determined based on the measured photo-signal or the offset applied to the second amplifier.

Example 24 includes the subject matter of any of Examples 14-23, and further specifies that the processor is coupled linearize the photo-signal based on a back calculation of the received photo-signal to a network node between the first amplifier and the second amplifier.

Example 25 includes the subject matter of any of Examples 14-25, and further includes a digital potentiometer and digital-to-analog convertor coupled to the processor and second amplifier to establish the variable gain and offset.

Example 26 includes the subject matter of any of Examples 14-25, and further includes a current source that provides a current to the photodetector based on an average photocurrent produced in response to the irradiation of the photodetector.

Example 27 includes the subject matter of any of Examples 14-26, and further specifies that the at least one dynamic calibration coefficient comprises two dynamic calibration coefficients A and B such that the calibration coefficient $b=A(E_{\text{eff}})+B$, wherein $E_{\text{eff}}$ is associated with the average power of the modulated optical beam.

Example 28 includes the subject matter of any of Examples 14-27, and further includes a current source that provides a current to the photodetector based on photodetector dark current.

In view of the many possible embodiments to which the principles of the disclosed technology may be applied, it should be recognized that the illustrated embodiments are only preferred examples and should not be taken as limiting the scope of the disclosure.

I claim:

1. A method, comprising:
    directing a modulated optical beam to a test photodetector;
    obtaining a modulation amplitude of a photo-signal associated with detection of a first portion of the modulated optical beam by the test photodetector;
    based on the modulation amplitude of the photo-signal from the test photodetector, determining at least one first calibration coefficient operable to linearize the test photodetector; and
    storing the at least one first calibration coefficient in a memory device.

2. The method of claim 1, further comprising:
    directing a second portion of the modulated optical beam to a reference photodetector;
    obtaining a modulation amplitude of a photo-signal associated with detection of the second portion of the modulated optical beam by the reference photodetector; and
    based on the modulation amplitudes of the photo-signals from the test photodetector and the reference photodetector, determining the at least one first calibration coefficient.

3. The method of claim 1, wherein the modulation of the optical beam is established based on a variable activation of an optical source that produces the optical beam or a variable attenuator placed in the path of the optical beam from the optical source, and the at least one calibration coefficient is determined based on the modulation amplitude of the photo-signal from the test photodetector and the variable activation of the optical source or the variable attenuation.

4. The method of claim 1, wherein the photo-signal is a photodetector signal.

5. The method of claim 1, wherein the at least one first calibration coefficient comprises only one first calibration coefficient.

6. The method of claim 1, wherein the at least one first calibration coefficient comprises three first calibration coefficients associated with linearization based on an exponential function having an offset.

7. The method of claim 1, wherein the at least one first calibration coefficient comprises calibration coefficients a, b, c, wherein a linearized photo-signal is produced as $I_{LINEAR} = \alpha \exp(bI_{MEAS}) + c$, wherein $I_{LINEAR}$ is the linearized photo-signal associated with a measured photo-signal $I_{MEAS}$.

8. The method of claim 1, wherein the at least one first calibration coefficient comprises a first calibration coefficient b, wherein a linearized photo-signal is produced as $I_{LINEAR} = \exp(bI_{MEAS})$, wherein $I_{LINEAR}$ is the linearized photo-signal associated with a measured photo-signal $I_{MEAS}$.

9. The method of claim 7, wherein the first calibration coefficients a, b, c are constants.

10. The method of claim 1, further comprising:
varying an average power of the modulated optical beam directed to the test photodetector;
determining at least one second calibration coefficient based on the varying average power of the modulated optical beam, wherein the second calibration coefficient is at least one dynamic calibration coefficient associated with an average power dependence of a selected one of the first calibration coefficients; and
storing the least one second calibration coefficient in the memory device.

11. The method of claim 9, wherein the at least one second calibration coefficient is associated with the calibration coefficient b.

12. The method of claim 11, wherein the at least one dynamic calibration coefficient comprises two calibration coefficients A and B such that the calibration coefficient $b = A(E_{eff}) + B$, wherein $E_{eff}$ is associated with the average power of the modulated optical beam.

13. The method of claim 12, further comprising linearizing a measured photo-signal as $I_{LINEAR} = \exp(bI_{MEAS})$, wherein $I_{LINEAR}$ is the linearized photo-signal associated with a measured photo-signal $I_{MEAS}$.

* * * * *